Patented Sept. 22, 1925.

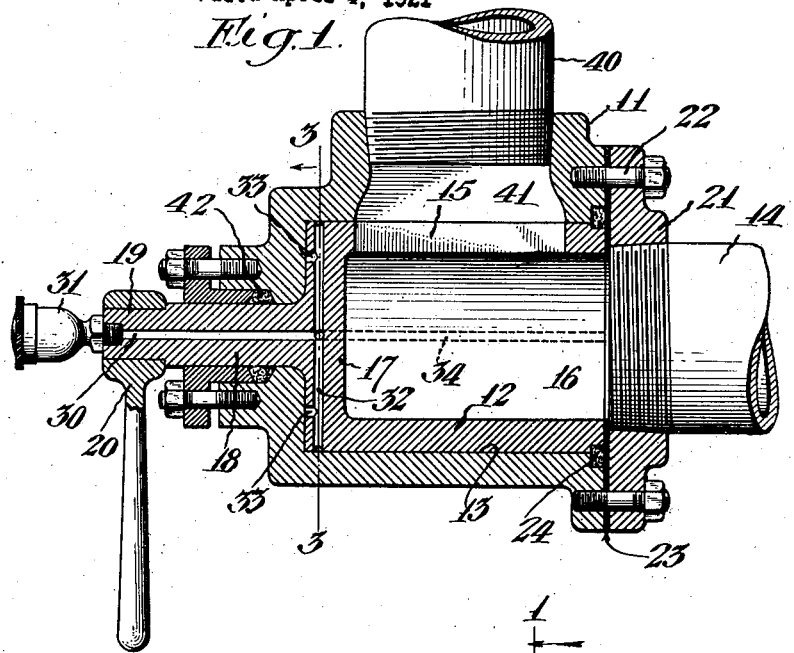
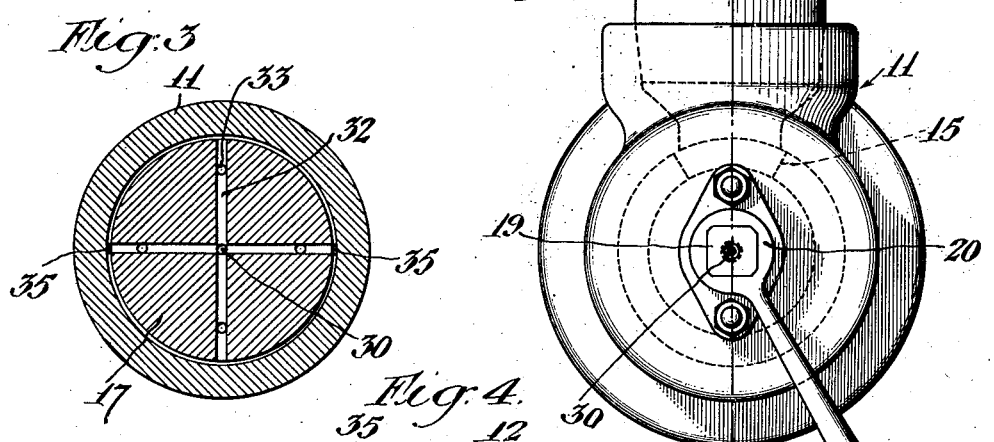
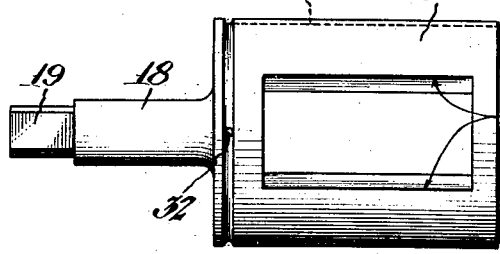

1,554,470

UNITED STATES PATENT OFFICE.

MILON J. TRUMBLE, OF ALHAMBRA, CALIFORNIA, ASSIGNOR TO TRUMBLE GAS TRAP CO., A COPARTNERSHIP CONSISTING OF MILON J. TRUMBLE, FRANCIS M. TOWNSEND, AND ALFRED J. GUTZLER, OF LOS ANGELES, CALIFORNIA.

VALVE.

Application filed April 4, 1921. Serial No. 458,253.

To all whom it may concern:

Be it known that I, MILON J. TRUMBLE, a citizen of the United States, residing at Alhambra, county of Los Angeles, and State of California, have invented a new and useful Improvement in Valves, of which the following is a specification.

My invention relates to valves through which fluids are ejected under considerable pressure.

The principal object of the invention is to provide a valve which will be very long lived when used for this purpose.

Further objects and advantages will be made evident hereinafter.

Referring to the drawing which is for illustrative purposes only,

Fig. 1 is a section through one form of my invention on a plane represented by the line 1—1 of Fig. 2.

Fig. 2 is an end view of my invention.

Fig. 3 is a section on a plane represented by the line 3—3 of Fig. 1.

Fig. 4 is a top plan view of the rotor of the valve as it appears when removed from the casing.

In the form of the invention shown a casing 11 is provided having a cavity 13 in which a rotor 12 is placed. The rotor 12 consists of a cylindrical member having a cylindrical cavity 16 therein and having a rectangular opening 15 in one side thereof communicating with the central cavity. The central cavity 16 is open at one end and is provided with a closing wall 17 at the other end. Centrally secured on the closing wall 17 is a stem 18 terminating in a square shank 19, this shank being of suitable size to receive a wrench 20. A stuffing box 42 is provided around the shank in the body 11 to make a fluid tight joint therearound. An inlet pipe 14 is secured in a flange 21 which is secured by studs 22 to the body 11, a gasket 23 being provided between the body 11 and the flange 21. A packing 24 is also provided making a triple joint between the body 11, the gasket 23 and the rotor 12. A grease channel 30 is provided through the stem 18 being supplied with grease by means of a standard grease cup 31. Closed channels 32 are provided in the wall 17 and holes 33 are provided for thoroughly lubricating the outer surface of the wall 17 longitudinally. Grooves 35 are provided in the outer surface of the rotor 12 so that a very thorough lubrication may be secured about the entire rotor 12. An outlet pipe 40 is secured in the body 11.

The method of operation is as follows:

The valve has a special utility when considerable pressure is relieved therethrough and when highly abrasive materials are carried in the fluid. This condition is found in handling certain oil, water or steam carrying sand, mud, silt, or other abrasive particles. The outlet pipe 40 communicates with the chamber 41 having a rectangular opening somewhat smaller than the opening 15. The rotor 12 may be turned inside the shell 11 to bring the opening 15 in register with the chamber 41 or to turn it completely around so that this chamber is shut off. It is possible by using this valve to regulate the amount of flow by allowing only a small portion of the openings 15 to register with the chamber 41.

When operating under these conditions in the presence of abrasive particles, considerable wear results on the edges of the opening 15 but this wear does not destroy the efficiency of the valve, it simply requires that it be turned a little further to shut off the flow. The edges of the opening 15 are very long and a great deal of wear may take place thereon before the efficiency of the valve is impaired.

I claim as my invention:

In a valve, the combination of: a shell having a cylindrical cavity therein and an outlet opening registering with said cylindrical opening at one side thereof; a rotor fitting inside said cylindrical cavity, said rotor having a central cavity extending axially therein, and an opening in the periphery of said rotor so placed that it may be made to register with the outlet opening in said shell, said shell being also provided with an axial opening communicating with said central cavity in said rotor; a flange closing said axial opening, said flange bearing against the end of said rotor and making a fluid tight connection therewith, said flange being provided with an inlet pipe which delivers fluid to said central cavity of said valve; and means by which said rotor may be turned in said means comprising a stem formed integral with said rotor and extending through an end of said shell and a lever secured to an end of said stem; a stuffing box encircling said stem, said stem having a lubricating passage extending longitudinally therethrough; a grease cup secured to the outer end of said stem and having communication with said lubricating passage, an end wall of said rotor having radial lubricating passages therein communicating with the inner end of said longitudinal lubricating passage in said stem, said rotor also having longitudinal lubricating passages in the periphery thereof communicating at one end with the outer ends of said radial passages, said end wall of said rotor having lubricating passages extending outwardly and transversely from said radial passages to an end wall of said shell adjacent said end wall of said rotor.

In testimony whereof, I have hereunto set my hand at Los Angeles, California, this 28th day of March, 1921.

MILON J. TRUMBLE.